(12) United States Patent
Goodman et al.

(10) Patent No.: US 12,483,424 B2
(45) Date of Patent: Nov. 25, 2025

(54) SYSTEM AND METHOD FOR COLLECTIVE DIGITAL SIGNATURE GROUPING

(71) Applicant: Dell Products L.P., Round Rock, TX (US)

(72) Inventors: Bradley K. Goodman, Nashua, NH (US); James Daniel Harms, Worthington, OH (US)

(73) Assignee: Dell Products L.P., Round Rock, TX (US)

( * ) Notice: Subject to any disclaimer, the term of this patent is extended or adjusted under 35 U.S.C. 154(b) by 310 days.

(21) Appl. No.: 18/306,495

(22) Filed: Apr. 25, 2023

(65) Prior Publication Data

US 2024/0364539 A1    Oct. 31, 2024

(51) Int. Cl.
*H04L 9/32* (2006.01)
*H04L 9/30* (2006.01)

(52) U.S. Cl.
CPC .............. *H04L 9/3255* (2013.01); *H04L 9/30* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 2002/0029337 A1* | 3/2002 | Sudia | H04L 9/3268 380/282 |
| 2002/0129238 A1* | 9/2002 | Toh | H04L 63/12 713/153 |
| 2015/0200935 A1* | 7/2015 | Ikeda | H04L 63/0861 726/7 |

* cited by examiner

*Primary Examiner* — William J. Goodchild
(74) *Attorney, Agent, or Firm* — WOMBLE BOND DICKINSON (US) LLP

(57) ABSTRACT

Systems, devices, and methods for managing data processing systems are disclosed. The data processing systems may provide computer implemented services based on communications between the data processing systems. To manage the data processing systems, a signing framework may be enforced to interpret and/or resolve operations invoked by the communications. The signing framework may be used by data processing systems to reduce the likelihood of undesired use and/or interaction with the data processing systems caused by unsecure communications.

20 Claims, 7 Drawing Sheets

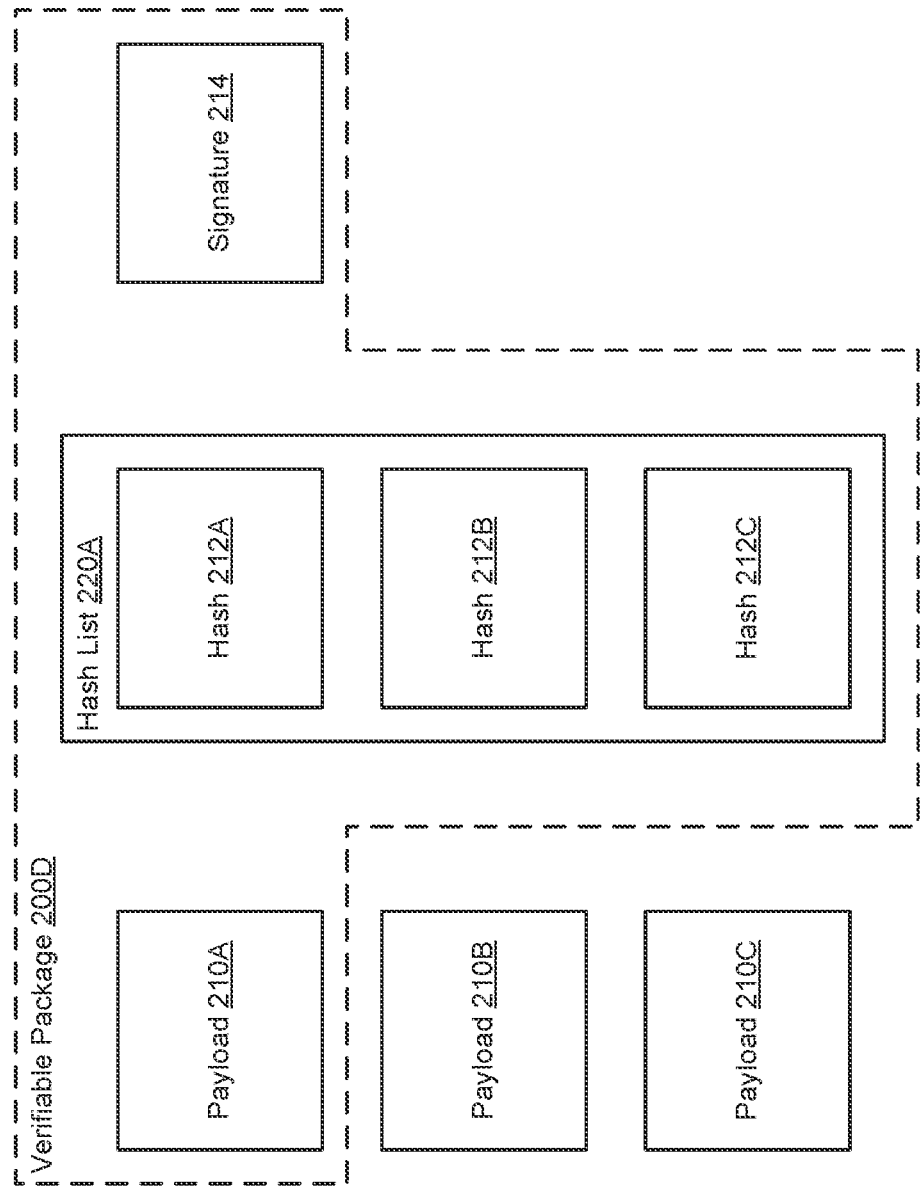

SYSTEM AND METHOD FOR COLLECTIVE DIGITAL SIGNATURE GROUPING

FIELD

Embodiments disclosed herein relate generally to managing data processing systems. More particularly, embodiments disclosed herein relate to systems and methods to secure systems by enforcing a signing framework.

BACKGROUND

Computing devices may provide computer implemented services. The computer implemented services may be used by users of the computing devices and/or devices operably connected to the computing devices. The computer implemented services may be performed based on transmitted data between data processing systems. Operations initiated by the transmitted data may impact performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A-2C show diagrams illustrating data structures in accordance with an embodiment.

DETAILED DESCRIPTION

Figure 1:
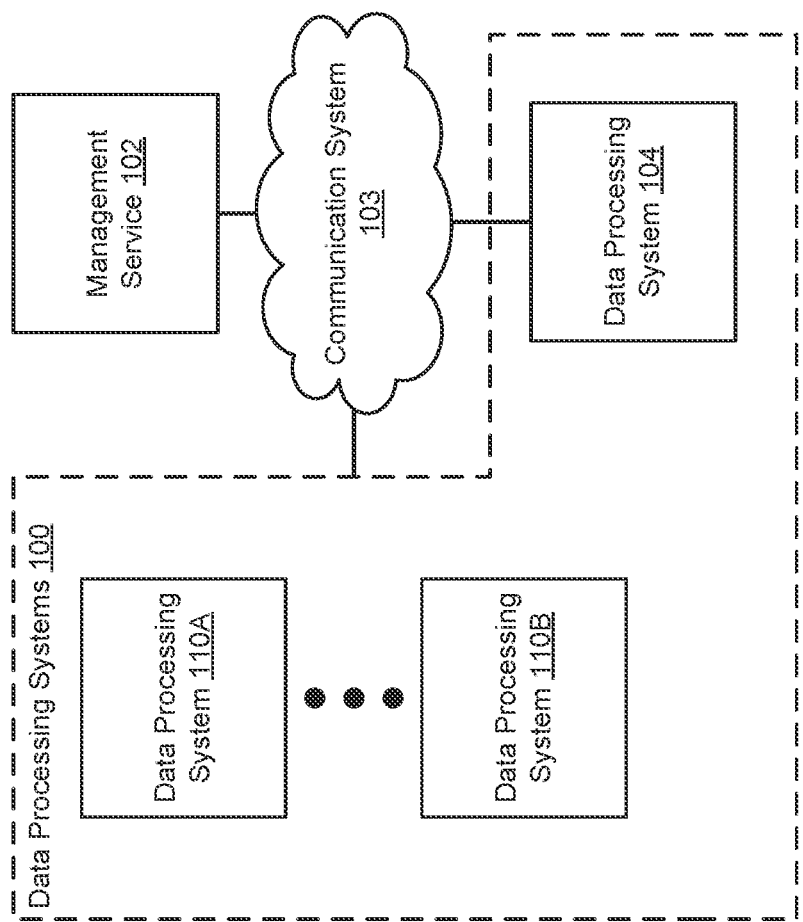
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data processing systems. The data processing systems may provide computer implemented services. To provide the computer implemented services, the data processing systems may use payloads to guide their operation. These payloads may indicate operations (e.g., as indicated by payloads included in communications) on which the computer implemented services depend. For example, the payloads may indicate any type and/or quantity of operations that are to be performable by data processing systems. These operations may determine how the computer implemented services are to be provided by the data processing systems.

However, the operations indicated by the payloads may pose a security risk to the data processing systems. Payloads may include code or instructions that when executed or performed may delay, and/or prevent entirely, the computer implemented services. A malicious entity may leverage payloads to compromise or otherwise cause undesired operation of the data processing systems.

In general, embodiments disclosed herein may provide methods, systems, and/or devices for securing systems using a signing framework. The signing framework may be used to manage verifications of payloads used by data processing systems by allowing multiple payloads to be verified using a single signature. Consequently, fewer numbers of gestures may be required to facilitate verification of payloads.

To allow multiple payloads to be verified using a single signature, the signing framework may (i) implement one-way functions to obtain one or more one-way results (e.g., one or more hashes) for one or more corresponding payloads (e.g., messages to be transmitted), (ii) organize any number of the one-way results and payloads into a data structure that is signed and verifiable using the single signature, (iii) send a subset of the payloads, some of the organized one-way results, and the signature to a receiving entity to provide the subset of the payloads in a verifiable form without distributing all of the payloads to the entity, and (iv) allow other entities to use the signed and verifiable data structure to verify that the accompanying subset of the payloads is from an alleged sender (e.g., a presumed source of the payload).

By using the signing framework, the likelihood of malicious payloads being trusted, and therefore, interpreted as secure payloads, may be decreased. Such systems using the signing framework may be less likely to be impacted by undesired effects caused by malicious payloads. Thus, such methods, systems, and/or devices for securing systems using the signing framework may enhance the security of data processing systems.

Accordingly, systems in accordance with embodiments disclosed herein may alleviate an arduous process of signing and/or authorizing a large number of payloads by permitting a single signing to secure any number of payloads. The resulting singly signed data structure may be used by receiving entities to verify some of the payloads corresponding with one of the one-way results that are selectively provided to the receiving entities.

In an embodiment, a method for securing data processing systems is provided. The method may include obtaining, by a first data processing system of the data processing systems, a payload to be used by a second data processing system of the data processing systems; obtaining a one-way result for the payload using a one-way function; obtaining an envelope using the one-way result; obtaining, using a gesture controlled private key, a signature usable to verify authenticity of the envelope, the signature being verifiable using a public key corresponding to the gesture controlled private key; and providing the payload, the envelope, and the signature to the second data processing system.

Obtaining the one-way result may include generating a hash of the payload using the one-way function, the one-way function being a hash function.

Obtaining the one-way result may also include generating a second hash of a second payload using the one-way function, the second payload to be sent to a third data processing system; and adding the hash and the second hash to a hash list, the envelope comprising the hash list.

Obtaining the one-way result may further include generating a third hash of the hash list; and adding the third hash to a second hash list to obtain a hash tree, the envelope comprising at least a portion of the hash tree.

Obtaining the signature usable to verify the authenticity of the envelope may include signing, using the gesture controlled private key and as part of the envelope, at least one of: the hash; the hash list; and the hash tree.

The method may also include identifying an index for the hash in the hash list. The index may also be provided to the second data processing system.

The method may also include obtaining a third payload, a second envelope, and a second signature generated using a second gesture controlled private key of a entity alleged to have originated the third payload; making a first determination regarding whether the second envelope can be verified using the second signature and a second public key corresponding to the second gesture controlled private key; in a first instance of the first determination where the second envelope can be verified using the second signature: making a second determination regarding whether the third payload can be verified using the second envelope; in a first instance of the second determination where the third payload is verified using the second envelope: determining that the third payload is from the entity; and in a second instance of the second determination where the third payload is not verified using the second envelope: determining that the third payload is not trustworthy.

Making the first determination regarding whether the envelope can be verified using the second signature may include identifying the second public key; and performing a signature verification using the second public key to identify whether the second envelope was signed using the second gesture controlled private key.

Making the second determination regarding whether the third payload can be verified using second envelope may include obtaining a presumed one-way result of the third payload using a presumed one-way function; and identifying whether the presumed one-way result is present in the second envelope.

Making the second determination regarding whether the third payload can be verified using the second envelope may additionally include obtaining an index from the entity; reading a portion of the second envelope using the index; and comparing the portion of the envelope to the presumed one-way result to identify whether the presumed one-way result is present in the second envelope.

In an embodiment, a non-transitory computer readable medium is provided. The non-transitory computer readable medium may include instructions which when executed by a processor cause the computer-implemented method to be provided.

In an embodiment, a data processing system is provided. The data processing system may include the processor and computer readable medium and may perform the computer-implemented method.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, data processing systems may send and/or receive data and/or may use various data structure. The data that is sent and/or received by one or more of the data processing systems may include any type and/or quantity of information, and the data structure may similarly include any type and quantity of data. For example, the data may be transmitted in the form of a payload (e.g., a message, an invoked command, and/or other data structures in which the data is organized and transmittable) and the data structures may include similar information. If transmitted, the data may be transmitted over a communication system in which the one or more data processing systems are operably connected. These communications or other data structure (also referred to as "payloads") may determine how the computer implemented services are to be provided by the data processing systems.

However, the payloads may pose a security risk to the data processing systems. The payloads may include code or instructions that when executed or performed may delay, and/or prevent entirely, the computer implemented services. For example, the code or instructions included in the transmitted payload may, when executed or performed, change operation of a data processing system. The change in operation may prevent the data processing system from providing the computer implemented services or may cause other undesired impacts.

Thus, the payloads may be provided to data processing systems under a false guise (e.g., a nefarious third party may intercept communications between two parties, altering the communication and/or pretending to be one of the two parties) to induce the data processing systems to perform actions that may not result in desirable outcomes.

To mitigate the risk to security presented by payloads, a verification process may be performed. The verification process may be used to establish trust for a payload. This trust may be established by identifying and verifying a source of the payload by a recipient of the payload.

To do so, the verification process may include using public/private key pairs. For example, a first entity may have a key pair generated for the first entity. A public key of the key pair may be published for public access, and a private key (corresponding with the public key) of the key pair may be kept secret (e.g., only known/accessible by the first entity). When trying to communicate with a second entity or allow for other types of payloads to be validated, the first entity may sign the payload with the private key (e.g., ingest the message and the private key into an algorithm to obtain a signed data structure). The second entity may use the public key (accessible due to being published for public access) to verify that the signed payload is from the first entity (verify that the signed data structure is signed using the private that corresponds with the public key). Thus, so long as the first entity is trusted, the second entity may trust the verified payload.

However, the security provided by public-private key pairs may depend on the secrecy of the private keys. If a malicious entity gains access to private keys, the malicious entity may sign data structures which appear to be from another entity. Consequently, a malicious entity may use the private key to cause a data processing system to trust payloads from the malicious entity thereby allowing the malicious entity to induce performance of actions that may result in further compromise of the data processing system, or other undesired outcomes.

To secure private keys, access to the private keys may be gated using a physical user-interaction (e.g., a gesture) to sign data structures using the private key. This process may limit access to the private keys thereby improving the security of private keys. For example, performance of a gesture may facilitate the signing of the payload (by the first entity) using the private key. the gesture may be implemented as a facial recognition (e.g., moving a face of a user into view of a camera system), fingerprint recognition (e.g., pressing a digit against a sensor), a pattern of interaction with graphical user interface (e.g., unlock patterns) using a particular piece of hardware (e.g., thereby limiting access to the private key to the holder of the hardware), and/or any other physical user-interaction used to facilitate signing and authorization of payloads.

By limiting access to physical keys by requiring gestures to be performed, malicious entities may be less likely to be able to use private keys of other entities to sign payloads.

However, gesture based gating processes for private keys may be arduous for an entity to perform. For example, if a person is required to perform a fingerprint recognition every time a payload must be signed, then the person may be required to perform a fingerprint recognition hundreds of times (e.g., to sign and authorize each of the payloads). As the needs for securing data processing systems increases, gating access to private keys using gestures may make signing payloads intractable if gesture based verification for use of the private key is required to individually sign payloads.

In general, embodiments disclosed herein may provide methods, systems, and/or devices for securing payloads used by data processing systems (DPSs) in a manner that reduces the number of times gesture based verifications for access to private keys may need to be performed. To secure the payloads, multiple payloads may be secured using a single signature. Consequently, fewer numbers of gestures based verifications may need to be performed to sign payloads.

To sign multiple payloads using a single signature, a signing framework may implemented that may (i) implement one-way functions to obtain one or more one-way results (e.g., one or more hashes) for one or more corresponding payloads (e.g., messages to be transmitted), (ii) organize any number of the one-way results into a data structure (e.g., an envelope) that is signed and verifiable using a single signature, and/or (iii) provide a subset of the payloads, some of the envelope, and the signature to an entity to provide the subset of the payloads in a verifiable form without distributing all of the payloads and/or envelope to the entity (a "verifiable package"). Another entity that obtains the verifiable package may use the signature to verify the envelope, the envelope to verify that the accompanying subset of the payloads is to be trusted (e.g., from an alleged sender which may be referred to as a presumed source of the payload). The subset of the payloads may be one or more of the payloads.

Accordingly, systems in accordance with embodiments disclosed herein may alleviate (at least in part) the arduous process of gaining access to private keys used in signing and/or authorizing a large number of payloads by permitting a single signing to secure any number of payloads. The resulting singly signed verifiable package may be used by entities to verify whether payloads should be trusted.

To provide the above noted functionality, the system of FIG. 1 may include data processing systems (DPSs) 100, management service 102, communication system 103, and data processing system (DPS) 104. Each of these components is discussed below.

DPSs 100 may include any number of DPSs (e.g., 110A-110B) that may provide computer implemented services. To provide the computer implemented services, any one of these DPSs (e.g., 110A-110B) may use payloads. The payloads may include any type and/or quantity of information. For example, the payloads may include code or instructions that when executed or performed may contribute to and/or modify the manner in which the computer implemented services are provided by DPSs 100.

However, as previously mentioned, payloads may pose a security risk to DPSs 100.

To manage the risk associated with payloads, DPSs 100 may enforce a signing framework in which multiple payloads may be secured using a single signature. To enforce the signing framework, for example, a first entity using a first DPS of DPSs 100 (e.g., 104) may provide a verifiable package to a second DPS of DPSs 100 (e.g., 110A). The verifiable package may include, for example, a payload specifying a command to be invoked by the first entity using DPS 104 that, when executed by DPS 110A, may cause computer implemented services to be provided in a particular manner.

The payload included in the verifiable package may be secured by ingesting the payload into a one-way function (e.g., a hashing function) to obtain a one-way result (e.g., a hash) based on the payload. The one-way result may then be ingested into a signing function with, for example, a private key of the first entity (with access to the private key being gated by a gesture) to obtain a signature for the verifiable package. Thus, DPS 104 may provide (i) the payload, (ii) the one-way result based on the payload, and (iii) the signature for the one-way result to DPS 110A.

To further enforce the signing framework, DPS 110A may verify that the provided signature is associated with the first entity (e.g., by conferring with management service 102, which may act as a key authority/publisher). Furthermore, the signature may be used to verify that the one-way result was likely generated by the first entity. The public key for the first entity published by management service 102 may be used to do the signature verification. The one-way result may be used to verify (and, therefore, trust) that the payload is from the first entity, and that the payload has not been modified since the verifiable package was generated.

To do so, DPS 110A may ingest the provided one-way result, with a public key of the first entity (the public key corresponding with the private key of the first entity), into a signature verification function. Because the public and private key correspond with one another (due to being from the same key pair associated with the first entity), the output of the signature verification function should indicate whether the signed data is likely from the first entity (e.g., and should be trusted if the first entity is also trusted).

If the signature indicates that the signed data should be trusted, DPS 110A may further verify whether the payload from the verifiable package should also be trusted. The determination may be made by ingesting the payload into a presumed one-way function (e.g., presumed to have been used to generate content of an envelope of the verifiable package) to obtain a second one-way result (that if matches the content of the envelope, indicates that the payload should be trusted). If the second one-way result matches the content of the envelope, then the payload may be verifiable as being from the first entity, and therefore, may be trusted by DPS 110A.

To facilitate verification of multiple payloads using a signature, multiple one-way results for multiple payloads may be aggregated into a single envelope. By signing the envelope, all of the one-way results may be verifiable, and all of the payloads corresponding to the one-way result of the envelope may be similarly verifiable.

To create verifiable packages using the payloads, envelopes, and signature, only payloads and portions of the envelope necessary to verify the payloads may be included in a verifiable package, along with the signature. Thus, distribution of the payloads may be limited by selective inclusion in verifiable packages.

For example, one-way result may be generated for each of the one or more payloads, and the one-way results may be grouped into a hash list. The hash list may be ingested with a gesture controlled private key to obtain a signature for an envelope that includes the hash list.

To further reduce the size of verifiable data packages, a hash tree may be used. The hash tree may include multiple levels. Only a portion of the hash tree may be included in an envelope so that other portions of the hash tree that are irrelevant to some payloads on which the hash tree is based may be excluded from the envelope. Consequently, the size of the envelope may be limited (e.g., when compared to inclusion of a flat list of hashes). In a scenario in which a hash tree is used, only the last hash in the portion of the hash tree may be signed. Therefore, at least a portion of subsequent hash lists may be provided by the first entity and verified by respective recipients similarly.

Figure 2A:
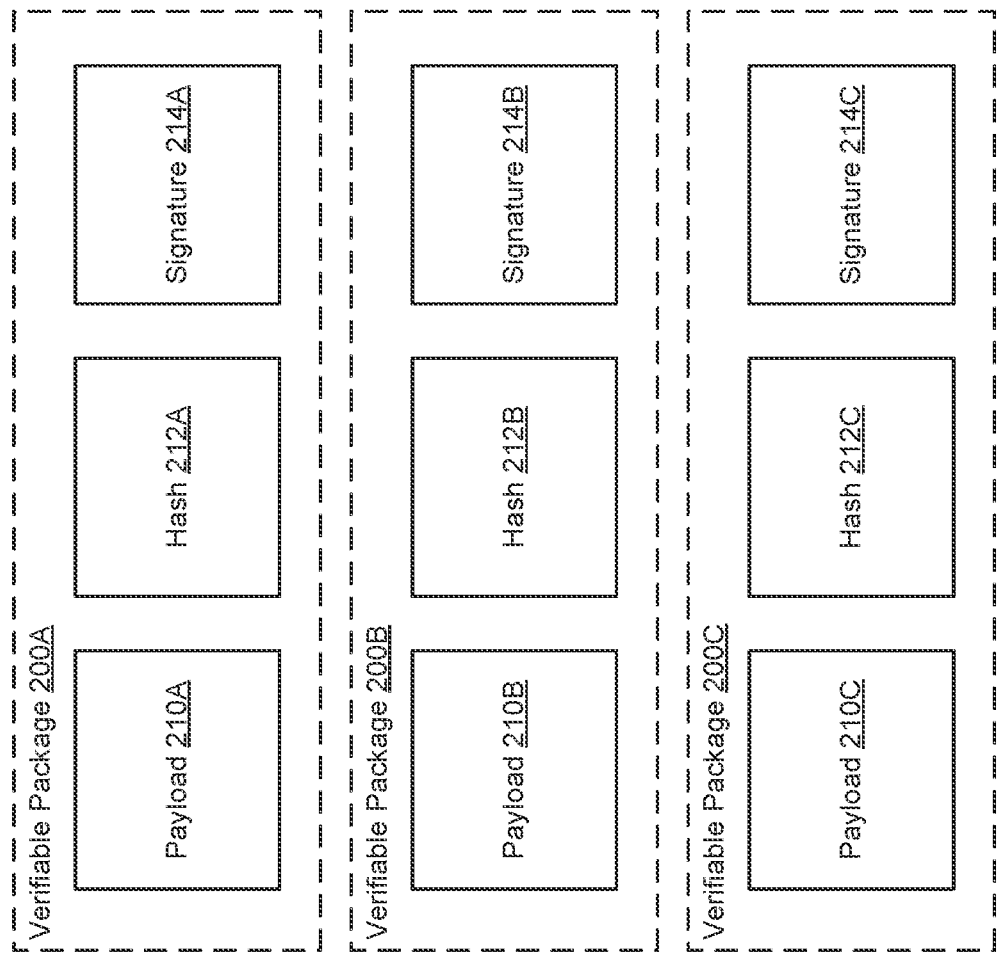
Figure 2C:
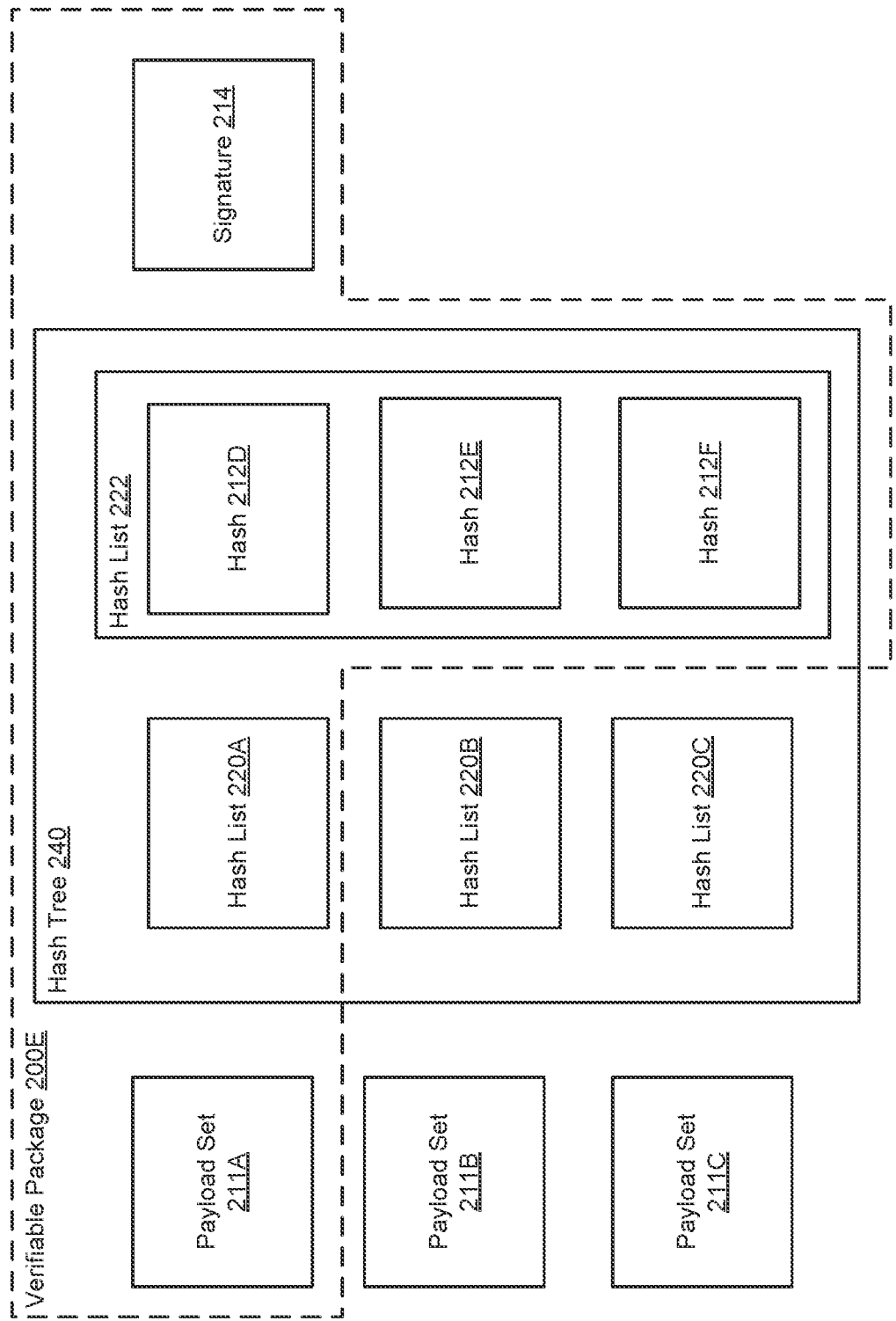

For additional information regarding verifiable packages (and payloads, hashes, hash lists, and/or a single signature included in the verifiable packages), refer to FIGS. 2A-2C.

Management service 102 may manage and/or provide information usable to establish trust for payloads. The information may include public keys for various entities. Management service 102 may publish the public keys, which may allow data processing systems 100 to identify public keys associated with entities.

Figure 3A:
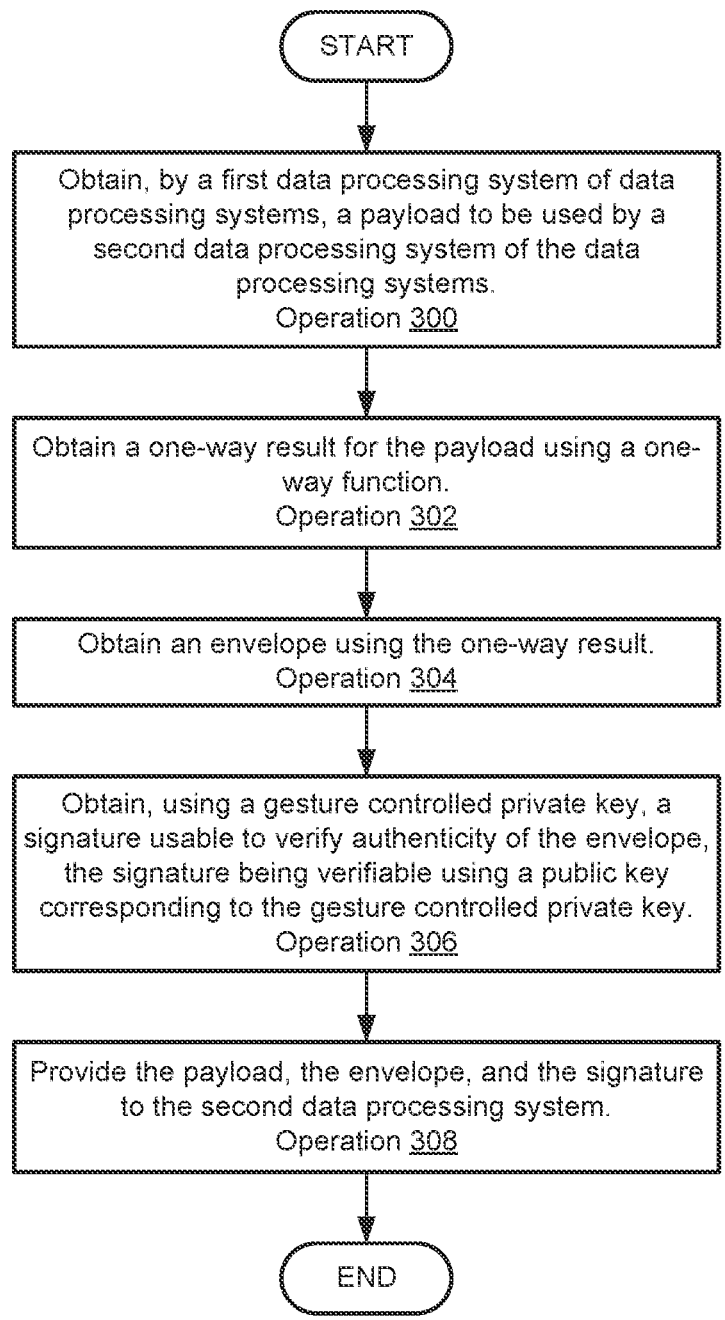
FIGS. 3A-3B show a flow diagram illustrating a method for securing systems using a signing framework in accordance with an embodiment.
Figure 3B:
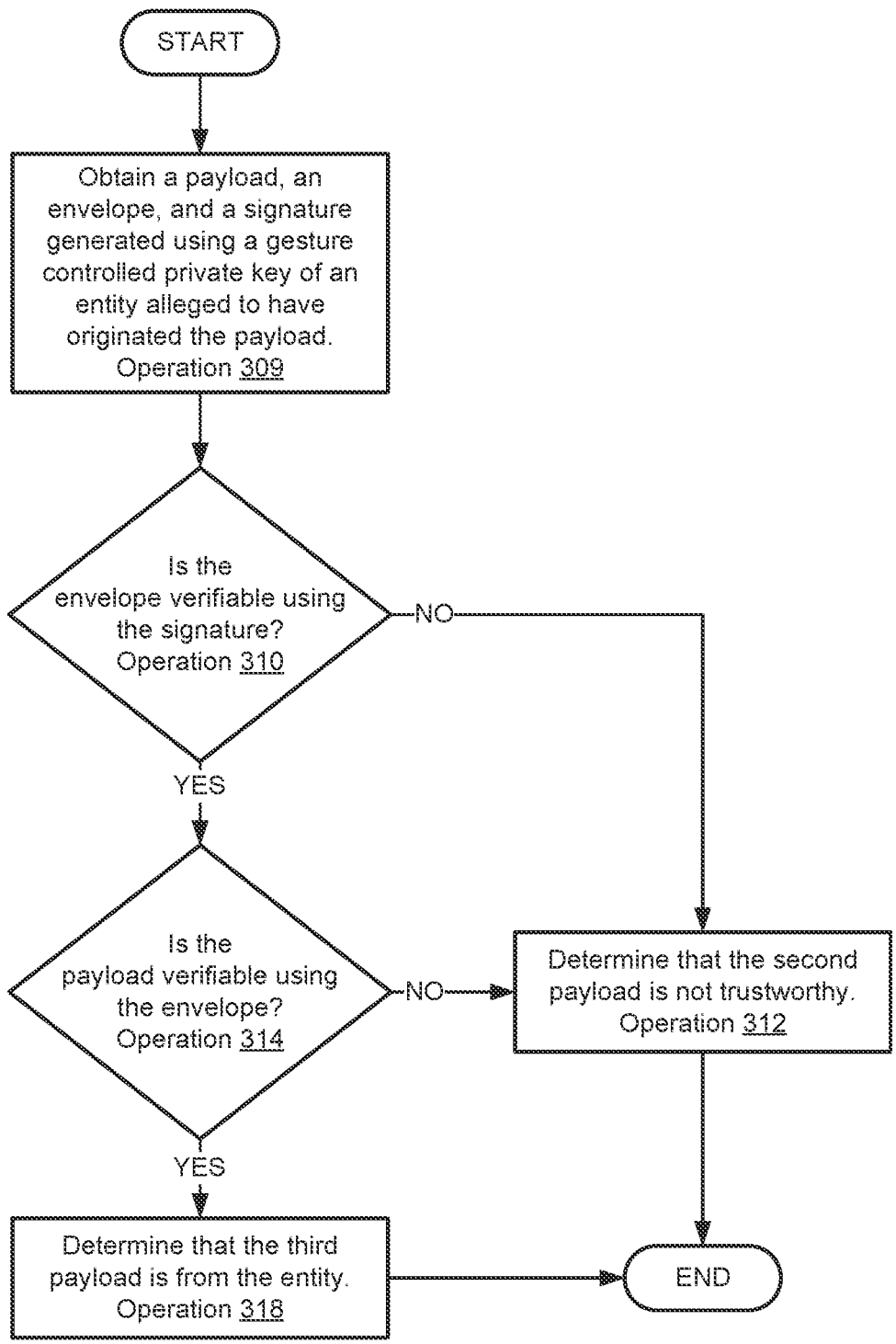

When performing their functionality, management service 102 and/or DPSs 100 may perform all, or a portion, of the methods and/or actions described in FIGS. 3A-3B.

DPSs 100 and/or management service 102 may be implemented using one or more computing devices such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 103. In an embodiment, communication system 103 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, data structure diagrams in accordance with an embodiment are shown in FIGS. 2A-2C. The data structure diagrams may illustrate data structures representative of payloads used by DPSs 100.

Turning to FIG. 2A, a first diagram of verifiable packages in accordance with an embodiment is shown.

Now, consider an example scenario where a data processing system is to invoke functions of three different data processing systems. To do so, the data processing system may generate verifiable packages 200A-200C. Each of these verifiable packages may include a payload (e.g., 210A-210C), a hash (e.g., 212A-212C), and a signature (e.g., 212A-212C). While these package may allow for verification of the respective payloads, these verifiable packages may require three separate access of a private key to generate signatures 214A-214C. Thus, while verifiable, obtaining verifiable packages in this manner may cause a person to perform a corresponding number of gestures to facilitate use of the private key three times. Consequently, this approach may be arduous for the person.

Turning to FIG. 2B, a second diagram of verifiable packages in accordance with an embodiment is shown.

Now, following the discussion of FIG. 2A, consider the same example scenario. However, instead of individually signing each of the hash (e.g., 212A-212C) of payloads 210A-210C, an envelope that includes all of the hashes (e.g., hash list 220A) is signed (e.g., signature 214). In contrast to signatures 214A-214C, signature 214 may allow for all of hashes 212A-212C to be verifiable.

To obtain a verifiable package usable to allow payload 210A to be verified, verifiable package 200D may be established. Verifiable package 200D may include payload 210A, hash list 220A, and signature 214. Hash list 220A may be verified using signature 214, and payload 210 may be verified using hash 212A. Thus, verifiable package 200D may allow payload 210A to be verified while only requiring a single gesture to be performed by the controller of the gesture controlled private key used to obtain signature 214.

Similarly verifiable packages for payload 210B and 210C may be obtained by replacing payload 210A with payload 210B or 210C. Thus, three separate verifiable packages usable to verify any of the payloads may be obtained with a single use of the gesture controlled private key.

Accordingly, the load placed on the user for obtaining these verifiable data packages may be much less than for obtaining verifiable packages 200A-200C.

Turning to FIG. 2C, a third diagram of verifiable packages in accordance with an embodiment is shown.

Now, following the discussion of FIG. 2B, consider a similar example scenario. However, rather than considering three payloads (e.g., 210A-210C), consider a scenario where multiple payloads (e.g., payload sets 211A-211C) may need to be verifiable by different entities. In this example scenario, hash tree 240 may be generated based on the payload sets which will be provided to respective entities.

Hash tree 240 may be obtained by first generating a hash for each payload in each payload set. The hashes for each payload may be aggregated into a hash list. For example, hash list 220A may include the hashes of the payloads of payload set 211A. Similar hash lists (e.g., 220B, 220C) may be obtained for other payload sets.

Once the hash lists (e.g., 220A-220C) are obtained, a hash (e.g., 212D-212F) of each hash list may also be obtained (and may be aggregated as hash list 222). While illustrated in FIG. 2C with respect to a two-layer hash tree, it will be appreciated that this process may be repeated any number of times to establish a hash tree of any depth.

Signature 214 may allow the last layer of hash tree 240 to be verified (i.e., the signature may only be for a portion of the data included in an envelope of verifiable package 200E).

To establish verifiable packages (e.g., 200E) for the different payload sets, each respective payload set, a relevant portion of hash tree 240, and signature 214 may be included in each verifiable package. The relevant portion of hash tree 240 may only include the portions necessary to verify the corresponding payload set.

For example, the portion of hash tree 240 included in the envelope of verifiable package 200E may include hash list 222 and hash list 220A. Signature 214 may allow each of the hashes of hash list 222 to be validated. Hash 212D may allow for hash list 220A to be validated. Hash list 220A may allow for payload set 211A to be validated.

Similarly verifiable packages for payload set 211B and 211C may be obtained. For example, the envelope of the verifiable package for payload set 211B may include hash list 220B and hash list 222. Similarly, the envelope of the verifiable package for payload set 211C may include hash list 220C and hash list 222.

Thus, as seen in FIG. 2C, the verifiable packages may include only a portion of hash tree 240. For large numbers of payloads, this approach may greatly reduce the size of the verifiable packages.

While not illustrated in FIGS. 2A-2C, additional information may be added to payloads and/or other portions of verifiable packages that may allow for more efficient validation and/or improve the security of verifiable packages. For example, indexes for hashes in hash lists corresponding to payloads (and/or aggregations of hashes in the context of hash trees) may be included in the verifiable packages. When a verifiable package is obtained, these indexes may be used to (i) quickly access the hashes usable to verify payloads and/or hash aggregations, and (ii) add an additional security check (e.g., check whether a hash corresponding to a payload is in a specific location in a hash list rather than just checking whether a hash usable to verify a payload is in a hash list at all).

While illustrated in FIGS. 2A-2C as having specific structures and organization, it will be appreciated that the structures and organization of data structures included in verifiable packages used by data processing systems may be different from those shown without departing from embodiments disclosed herein.

As discussed above, the components of FIG. 1 may perform various methods to secure systems using a signing framework. FIGS. 3A-3B illustrate methods that may be performed by the components of FIG. 1. In the diagrams discussed below and shown in these figures, any of the operations may be repeated, performed in different orders, omitted, and/or performed in parallel with or a partially overlapping in time manner with other operations.

Turning to FIG. 3A, a flow diagram illustrating a method for securing systems by enforcing a signing framework in accordance with an embodiment is shown. The method may be performed by data processing systems 100, management service 102, and/or other components of the system of FIG. 1.

At operation 300, a payload to be used by a second data processing is obtained by a first data processing system. The payload may be obtained by (i) reading the payload from storage, (ii) receiving the payload from another device, (iii) obtaining user input for the payload, and/or via other methods.

For example, a first entity (e.g., a person) may interact with the first DPS (e.g., through a graphical user interface and/or using peripheral devices such as a keyboard, computer mouse, etc.) to invoke a function of the second DPS. The interaction may provide, for example, a message, an invoked command, and/or other information which may be encoded as data to be provided to the second DPS.

Any number of payloads that may need to be verified by any number of entities may be obtained.

At operation 302, a one-way result for the payload is obtained using a one-way function. The one-way result may be obtained by ingesting the payload into the one-way function. The one-way function may be a hash function.

One-way function results for any number of payloads may be obtained. Thus, a hash list (or multiple hash lists corresponding to different portions of the payloads) may be obtained.

A hash tree may be obtained using the hash list. The hash tree may be obtained as described with respect to FIG. 2C.

At operation 304, an envelope is obtained using the one-way result. The envelope may include only the hashes (e.g., a hash list, portion of a hash tree, etc.) obtained in operation 302 necessary to verify the payload. The envelope may be obtained by filtering the hashes based on relevance for verifying the payload.

At operation 306, a signature usable to verify authenticity of the envelope is obtained using a gesture controlled private key. The signature may be obtained by (i) gaining access to the gesture controlled private key (e.g., by a user performing a gesture), (ii) ingesting all, or a portion, of the envelope into a signing function along with the gesture controlled private key. The portion of the envelope may include, in the context of a hash tree, only the last most hash list, or all of the hash lists if a hash tree is not included in the envelope. The signing function may generate a signature usable to validate the portion of the envelope using a public key corresponding to the gesture controlled private key.

At operation 308, a verifiable package (e.g., including the payload, the portion of the envelope, and the signature) are provided to the second DPS. The verifiable package may be provided by (i) transmitting the verifiable package to the second DPS via a communication system (e.g., 103), (ii) storing the verifiable package in a location accessible by the second DPS, and/or via other methods.

The method may end following operation 308.

Additionally, other verifiable data packages may be provided to other DPSs that allow the other payloads discussed with respect to operation 300 to be verified by the other DPSs.

Thus, using the method illustrated in FIG. 3A, any number of payloads may be placed in verifiable states using a single signature. Consequently, a gesture controlled private key used to make the payloads verifiable may only need to be accessed once thereby reducing the burden on the controller of the gesture controlled private key.

Turning to FIG. 3B, a flow diagram further illustrating the method for securing systems by enforcing a signing framework in accordance with an embodiment is shown. The method may be performed by data processing systems 100, management service 102, and/or other components of the system of FIG. 1.

At operation 309, a verifiable package (e.g., including a payload, an envelope, and a signature) is obtained. The verifiable package may be obtained from an alleged provider. The verifiable payload may be obtained by (i) receiving the verifiable package from another entity, (ii) reading the verifiable package from storage, and/or via other methods.

At operation 310, a determination is made regarding whether at least a portion of an envelope of the verifiable package can be verified using a signature of the verifiable package. The determination may be made by ingesting the portion of the envelope and a public key for the alleged provider into a signature verification function. The signature verification function may indicate whether the portion of the envelope may be verified using the signature.

If the envelope is verifiable using the signature, then the method may proceed to operation 314. Otherwise, the method may proceed to operation 312.

At operation 312, the payload is determined to not be trustworthy. the untrusted payload may be discarded or otherwise not used because it is not trusted.

The method may end following operation 312.

Returning to operation 310, the method may proceed to operation 314 when the envelope is verifiable using the signature.

At operation 314, a determination is made regarding whether the payload is verifiable using the envelope. The determination may be made by attempting to recreate the envelope (or at least a portion of it) using the payload. To do so, the payload may be ingested into a one way function presumed to have been used to generate the content of the envelope. The resulting one way function result may be matched against the envelope. If the one way function result matches a portion of the envelope, then the payload may be verifiable and/or addition internal verifications of the envelope may be performed (e.g., to recreate portions of a hash tree which may be included in the envelope, if recreated successfully then the payload may be verifiable).

If the payload is determined to not be verifiable using the envelope, then the method may proceed to operation 318. Otherwise, the method may proceed to operation 312. At operation 318, the payload is determined to be from the alleged sender (e.g., an entity alleged to have originated the verifiable package). The trustworthiness of the payload may then be inferred based on whether the entity alleged to have originated the verifiable package is also trustworthy or not trustworthy.

The method may end following operation 318.

Thus, using the method illustrated in FIGS. 3A-3B, embodiments disclosed herein may secure systems using the signing framework by enforcing the signing framework on payloads used by the data processing systems. The enforcement of the signing framework may decrease the likelihood of such systems experiencing undesired effects on their operation. By doing so, security of systems (e.g., data processing systems) may be improved.

Figure 4:
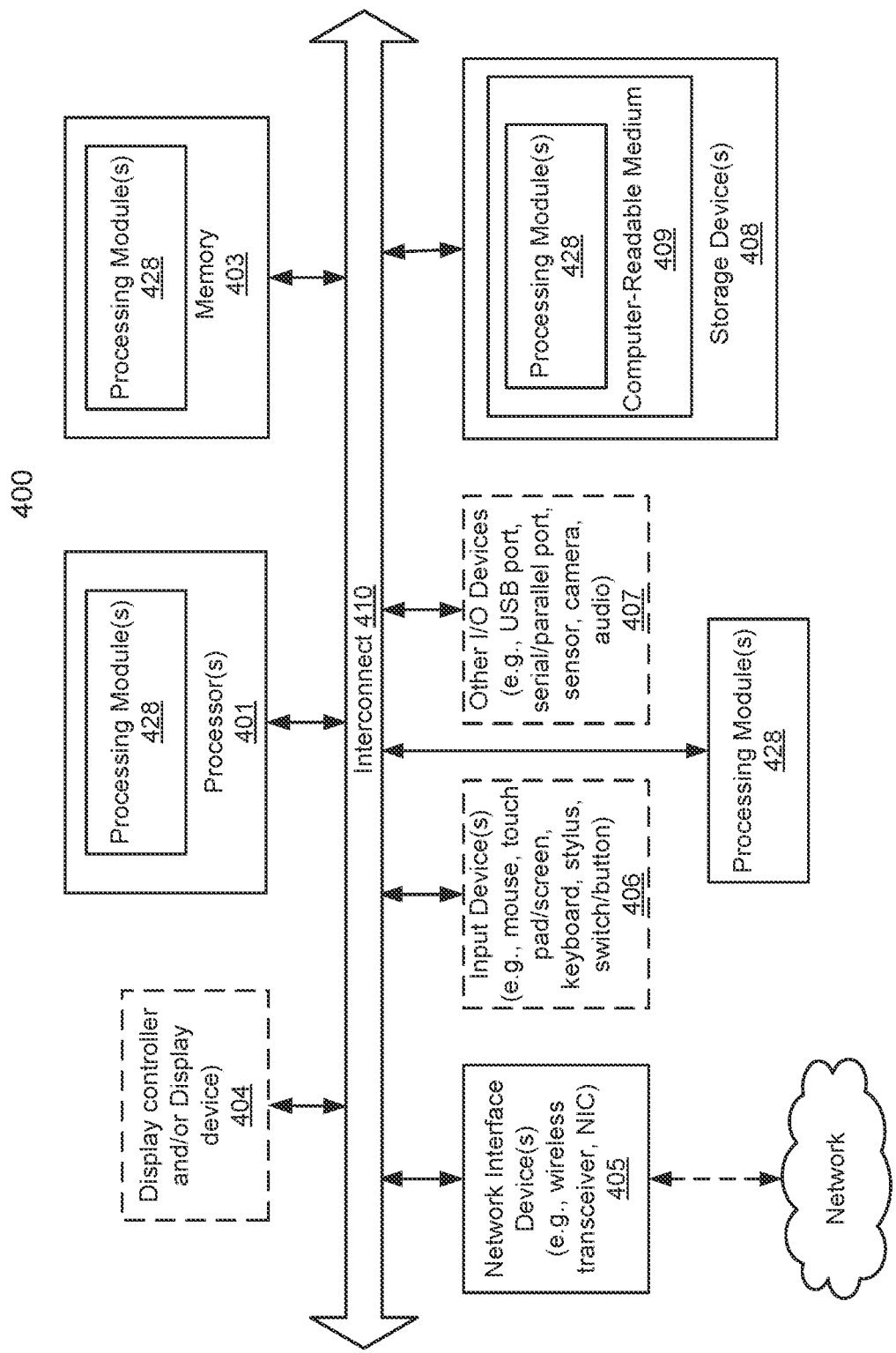
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing data processing systems, the method comprising:
    obtaining, by a first data processing system of the data processing systems, a payload to be used by a second data processing system of the data processing systems;
    obtaining a one-way result for the payload using a one-way function;
    obtaining an envelope using the one-way result;
    obtaining, using a gesture controlled private key, a signature usable to verify authenticity of the envelope, the signature being verifiable using a public key corresponding to the gesture controlled private key, a physical gesture of a user associated with the gesture controlled private key being needed for permission to access and use the gesture controlled private key; and
    providing the payload, the envelope, and the signature to the second data processing system.

2. The method of claim 1, wherein obtaining the one-way result comprises:
    generating a hash of the payload using the one-way function, the one-way function being a hash function.

3. The method of claim 2, wherein obtaining the one-way result further comprises:
    generating a second hash of a second payload using the one-way function, the second payload to be sent to a third data processing system; and
    adding the hash and the second hash to a hash list, the envelope comprising the hash list.

4. The method of claim 3, wherein obtaining the one-way result further comprises:
    generating a third hash of the hash list; and
    adding the third hash to a second hash list to obtain a hash tree, the envelope comprising at least a portion of the hash tree.

5. The method of claim 4, wherein obtaining the signature usable to verify the authenticity of the envelope comprises:
    signing, using the gesture controlled private key and as part of the envelope, at least one of:
        the hash;
        the hash list; and
        the hash tree.

6. The method of claim 3, further comprising:
    identifying an index for the hash in the hash list,
    wherein the index is also provided to the second data processing system.

7. The method of claim 1, further comprising:
    obtaining a third payload, a second envelope, and a second signature generated using a second gesture controlled private key of an entity alleged to have originated the third payload;
    making a first determination regarding whether the second envelope can be verified using the second signature and a second public key corresponding to the second gesture controlled private key;
    in a first instance of the first determination where the second envelope can be verified using the second signature:
        making a second determination regarding whether the third payload can be verified using the second envelope;
        in a first instance of the second determination where the third payload is verified using the second envelope:
            determining that the third payload is from the entity; and
        in a second instance of the second determination where the third payload is not verified using the second envelope:
            determining that the third payload is not trustworthy.

8. The method of claim 7, wherein making the first determination regarding whether the envelope can be verified using the second signature comprises:
    identifying the second public key; and
    performing a signature verification using the second public key to identify whether the second envelope was signed using the second gesture controlled private key.

9. The method of claim 8, wherein making the second determination regarding whether the third payload can be verified using second envelope comprises:
    obtaining a presumed one-way result of the third payload using a presumed one-way function; and
    identifying whether the presumed one-way result is present in the second envelope.

10. The method of claim 9, wherein making the second determination regarding whether the third payload can be verified using the second envelope further comprises:
    obtaining an index from the entity;
    reading a portion of the second envelope using the index; and
    comparing the portion of the envelope to the presumed one-way result to identify whether the presumed one-way result is present in the second envelope.

11. The method of claim 1, wherein two hashes of data payloads are generated using the one-way function during the obtaining of the one-way result, the data payloads comprising a second payload to be sent to a third data processing system and the payload, and the envelope comprises a hash list in which the two hashes are added.

12. The method of claim 1, wherein obtaining the one-way result comprises, at least:
    generating a hash of a second payload using the one-way function, the second payload to be sent to a third data processing system; and adding the hash to a hash list, the envelope comprising the hash list.

13. A non-transitory machine-readable medium having instructions stored therein, which when executed by a processor, cause the processor to perform operations for securing communications between data processing systems, the operations comprising:
    obtaining, by a first data processing system of the data processing systems, a payload to be used by a second data processing system of the data processing systems;
    obtaining a one-way result for the payload using a one-way function;
    obtaining an envelope using the one-way result;
    obtaining, using a gesture controlled private key, a signature usable to verify authenticity of the envelope, the signature being verifiable using a public key corresponding to the gesture controlled private key a physical gesture of a user associated with the gesture controlled private key being needed for permission to access and use the gesture controlled private key; and
    providing the payload, the envelope, and the signature to the second data processing system.

14. The non-transitory machine-readable medium of claim 13, wherein obtaining the one-way result comprises:
    generating a hash of the payload using the one-way function, the one-way function being a hash function.

15. The non-transitory machine-readable medium of claim 14, wherein obtaining the one-way result further comprises:
    generating a second hash of a second payload using the one-way function, the second payload to be sent to a third data processing system; and
    adding the hash and the second hash to a hash list, the envelope comprising the hash list.

16. The non-transitory machine-readable medium of claim 15, wherein obtaining the one-way result further comprises:
    generating a third hash of the hash list; and
    adding the third hash to a second hash list to obtain a hash tree, the envelope comprising at least a portion of the hash tree.

17. A data processing system, comprising:
    a processor; and
    a memory coupled to the processor to store instructions, which when executed by the processor, cause the processor to perform operations for securing communications between data processing systems, the operations comprising:
        obtaining, by a first data processing system of the data processing systems, a payload to be used by a second data processing system of the data processing systems;
        obtaining a one-way result for the payload using a one-way function;
        obtaining an envelope using the one-way result;
        obtaining, using a gesture controlled private key, a signature usable to verify authenticity of the envelope, the signature being verifiable using a public key corresponding to the gesture controlled private key a physical gesture of a user associated with the gesture controlled private key being needed for permission to access and use the gesture controlled private key; and
        providing the payload, the envelope, and the signature to the second data processing system.

18. The data processing system of claim 17, wherein obtaining the one-way result comprises:
    generating a hash of the payload using the one-way function, the one-way function being a hash function.

19. The data processing system of claim 18, wherein obtaining the one-way result further comprises:
    generating a second hash of a second payload using the one-way function, the second payload to be sent to a third data processing system; and
    adding the hash and the second hash to a hash list, the envelope comprising the hash list.

20. The data processing system of claim 19, wherein obtaining the one-way result further comprises:
    generating a third hash of the hash list; and
    adding the third hash to a second hash list to obtain a hash tree, the envelope comprising at least a portion of the hash tree.

* * * * *